(No Model.) 2 Sheets—Sheet 1.
J. N. PARKER.
HORSE HOE AND CULTIVATOR.
No. 422,620. Patented Mar. 4, 1890.
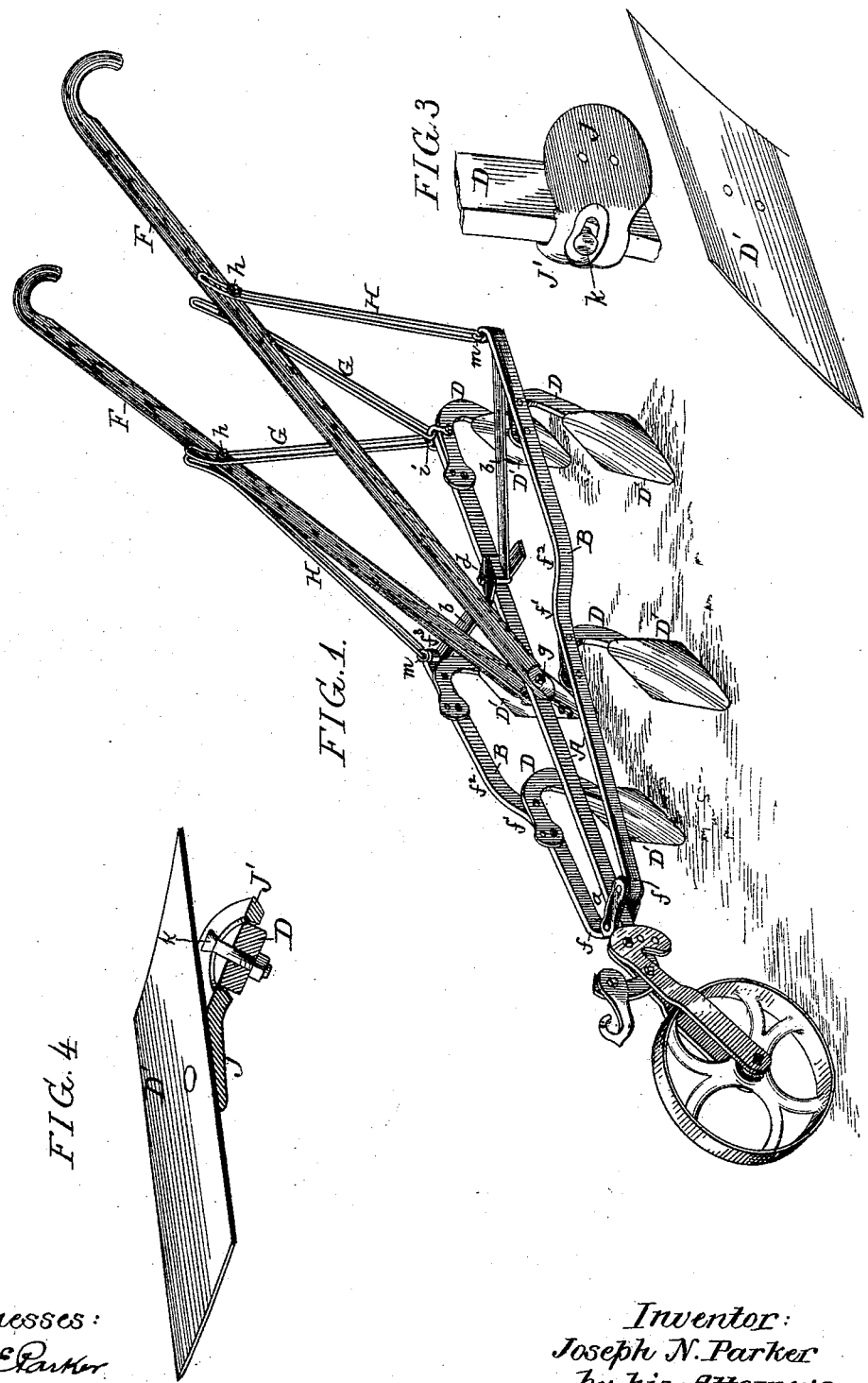
Witnesses:
Jno. E. Parker
William D. Bonner
Inventor:
Joseph N. Parker
by his Attorneys
Howson & Howson

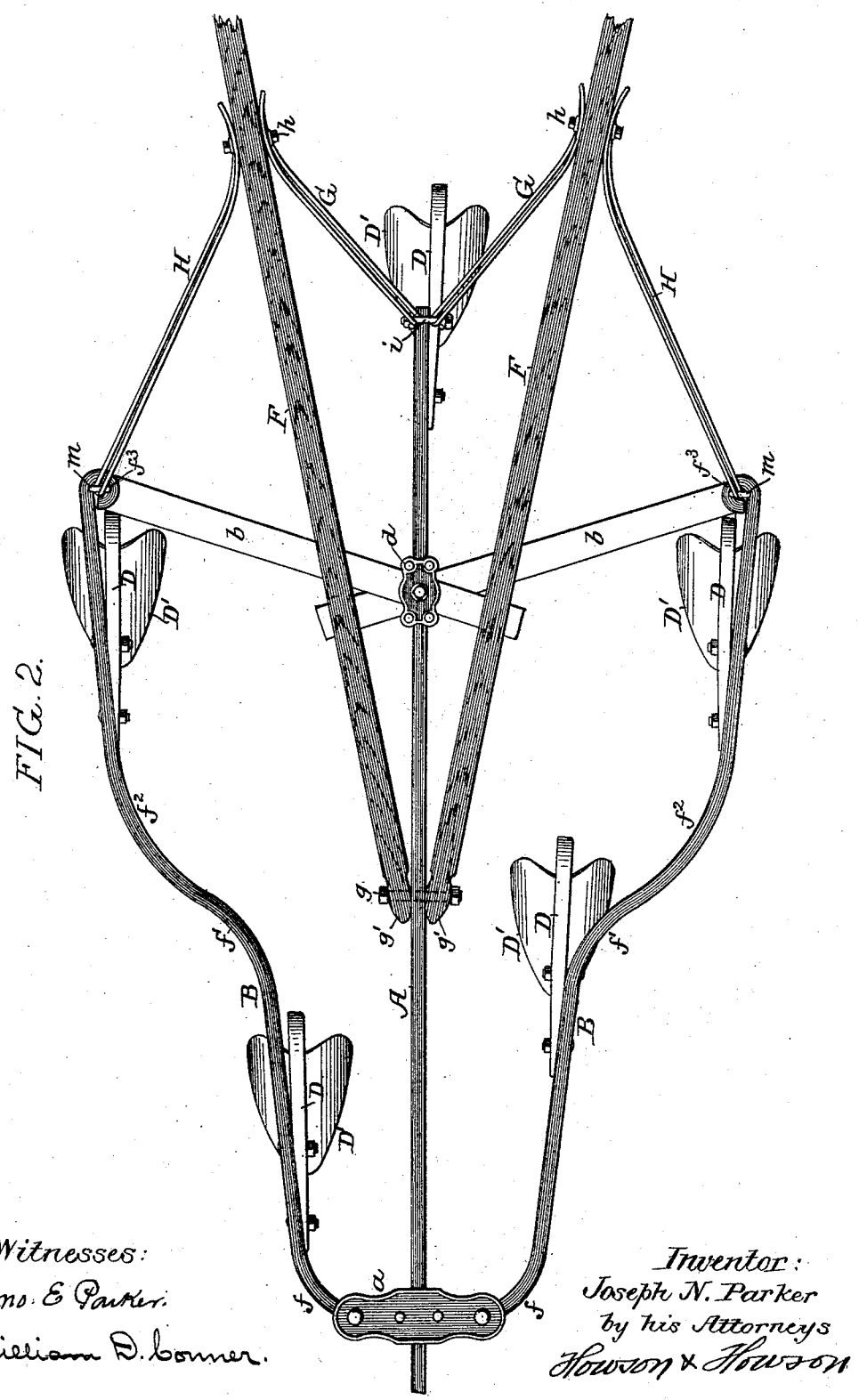

UNITED STATES PATENT OFFICE.

JOSEPH N. PARKER, OF VINELAND, NEW JERSEY.

HORSE-HOE AND CULTIVATOR.

SPECIFICATION forming part of Letters Patent No. 422,620, dated March 4, 1890.

Application filed August 5, 1889. Serial No. 319,725. (No model.)

*To all whom it may concern:*

Be it known that I, JOSEPH N. PARKER, a citizen of the United States, and a resident of Vineland, Cumberland county, New Jersey, have invented certain Improvements in Horse-Hoes and Cultivators, of which the following is a specification.

One object of my invention is to so construct a horse-hoe, harrow, or cultivator as to provide for independent adjustment of either of the handles to any desired position which the character of the work being performed may suggest as the most appropriate, further objects being to prevent abrasion of young trees or other standing crops by the frame or handles of the implement; to so construct the various parts of the implement that said parts may be used on either side, so that there will be no "right and left" pieces demanding care or skill in setting up the machine; to render the machine extremely compact when in the knockdown form for shipment or storage, and to insure the firm and rigid bracing and ready control of the rear ends of the bars of the frame. These objects I attain in the manner hereinafter set forth, reference being had to the accompanying drawings, in which—

Figure 1 is a perspective view of a horse-hoe, harrow, or cultivator constructed in accordance with my invention. Fig. 2 is a plan view of the same on a larger scale, and showing portions of the center bar and handles broken away. Fig. 3 is a perspective view of the hoe-blade, plow, or shovel attachment; and Fig. 4 is a sectional view of the same.

The machine is one of that class having a central bar A and opposite side bars B, the latter being hung at their front ends to a cross-head $a$ and provided at their rear ends with bars $b$, which cross each other beneath the central bar A and are adapted to be secured thereto by means of a clamp $d$, so that the rear end of the frame can be expanded or contracted, depending upon the width of the strip to be hoed, harrowed, or cultivated.

The opposite side bars B of the machine are curved inward at their front ends $f$, where they are pivoted to the cross-head $a$, and have inwardly-bent rear ends, forming eyes $f^3$ for the pivot-bolts of the spreader-bars $b$, and about midway of its length each bar B is formed with a reverse curve $f'\ f^2$, so that the contour of the opposite side bars of the frame of the machine consists wholly of longitudinal and curved lines, and as the standards D, carrying the cultivator-teeth, hoes, or harrows D', are all on the inside of said frame, the latter presents externally no sharp corners, angles, or projections to cut or abrade the trunks of young trees or the stalks of corn or other standing crops between the rows of which the machine is being drawn.

The standards D of the cultivator-teeth or hoe-blades are secured to the bars of the frame by suitable bolts and nuts, and the forwardly-projecting portion of each standard and the rear end of the central bar of the frame are wedge-shaped—that is to say, are tapered or beveled on each side—so that, although the outer bars B of the frame are generally adjusted at an angle in respect to the line of draft, the wedge shape of the front portion of each standard D insures the running of the blade or tooth in a line substantially parallel to the line of draft, and renders unnecessary such a wide spreading of the rear ends of the side bars in respect to the front ends as is required in ordinary machines.

The handles F F of the machine are hung to the central bar A of the frame by means of a bolt $g$ or other equivalent fastening, and each handle is provided with inner and outer braces G and H, which are secured to the handles at their upper ends by transverse bolts $h$, the lower ends of the inner braces G being hung to a loop or yoke $i$ at the rear end of the central bar of the machine and the lower ends of the outer braces H being hung to eyes $m$, formed at the upper ends of the bolts, whereby the spreader-bars $b$ are hung to the rear ends of the side bars B of the frame, so that each bolt serves two purposes. By this means each of the handles is rendered entirely independent of the other as regards its adjustment and the securing of the same in position after adjustment, so that by a simple slacking of the bolts the handles can be adjusted to any position which the character of the work to be performed by the machine suggests as the most appropriate, and can be secured in such position by again tightening the bolts. For instance, if the machine is being worked close up to a row of stalks in a corn-field or a row of trees in an orchard, or to a row of bushes or vines, the handle on that side of the machine may be moved inward, so that the hand of the person guiding the machine will not be bruised or lacerated by contact with the trunks, stalks, leaves, branches, or briers; or both handles may be moved over to one side of the machine; or, where the machine is being worked in a narrow strip between closely-placed rows of the crop, both handles may be moved inward to any desired extent, so as to prevent injury to the hands of the attendant guiding the machine.

The braces G and H (shown in the drawings) are composed of heavy wire or round bar-iron bent into loop form, this being an economical and effective way of making a slotted link which serves as a brace, although it will be evident that the brace may be composed of bar or plate iron slotted or punched for the reception of the confining-bolt and the pivotal eyes or loops.

The independent and independently-braced handles permit of the ready adjustment of said handles to suit the contraction or expansion of the rear end of the frame, the handles being, if desired, contracted or expanded accordingly, and the running of the braces from the handles to the rear ends of the central and side bars of the frame insures the rigid bracing of these parts of the frame and the direct connection of the same to the handles, so that a downward pressure or an upward lift can be readily imparted to the rear ends of either or all of the bars by the attendant.

The handles F have at the front ends pivot-bosses $g'$, curved on each side, so that each handle may be used on either side of the machine, and the same is true of the side bars B and the standards D, each of which is the exact counterpart of the others, so that perfect interchangeability is secured and objectionable rights and lefts in the parts of the implement are avoided; hence the implement cannot be set up improperly, no matter how hastily or with what little care this operation is performed.

It is frequently desirable to remove the cultivator-blades or harrow-teeth, or some of them, and to use in place of the blades or teeth thus removed hoe-blades, plows, or shovels, such, for instance, as shown in Fig. 3. In order to provide for the ready application or removal of such a hoe-blade, plow, or shovel and the ready adjustment of the same to any desired angle in respect to the line of draft, I provide a blade-carrier J, having at the inner end a segmental head J', slotted for the passage of the securing-bolt $k$, whereby it is confined to the shank or standard D, the latter having its bearing upon the inner curved face of the segmental head of the carrier, so that said carrier and its blade, plow, or shovel can be swung around on the shank or standard, so as to adjust the blade to any desired angle in respect to the line of draft of the machine.

A machine constructed in accordance with my invention can be packed into very small compass for storage or transportation, for when the handles are detached from the machine they can be laid closely side by side, owing to the absence of any brace or spreader bars between them, while the braces G and H and spreader-bars $b$ can be laid lengthwise of the bars A and B, and the side bars B can be swung in close to the center bar A.

Having thus described my invention, I claim and desire to secure by Letters Patent—

1. The combination of the side bars of the machine with the blades or teeth and their standards, said standards having forwardly-projecting wedge-shaped portions, whereby they may be secured to either side of the machine, substantially as specified.

2. A cultivator, horse-hoe, or harrow having a frame carrying the blades, plows, or shovels, handles pivoted to said frame and capable of swinging laterally in respect thereto, each handle being independent of and disconnected from the other, and independent braces for each handle, said braces being adjustably connected to the handles and being likewise pivoted to the frame, so as to swing laterally in respect thereto as either handle is adjusted laterally, substantially as specified.

3. The combination of the frame of the machine, comprising the center bar and opposite side bars, the handles independent of each other and hung to said central bar, inner braces for the handles extending from said handles to the rear end of said central bar, and outer braces extending from the handles to the rear ends of the outer side bars, substantially as specified.

4. The combination of the frame comprising central bar, side bars, and means for expanding and contracting the rear end of the frame, with independent handles hung to the central bar, and each having an inner brace running to the rear end of the central bar and an outer brace running to the rear end of one of the outer bars, substantially as specified.

5. The combination of the frame of the machine with the independent handles and independent braces therefor, each of said handles having at the front end a pivot-boss curved on both faces, so that the handle can be used on either side of the machine, substantially as specified.

6. A horse-hoe, harrow, or cultivator having a frame with like side bars, wedge-shaped teeth-standards, and handles having their pivot-bosses curved on both sides, whereby like parts of the machine are interchangeable and rights and lefts are avoided, substantially as specified.

In testimony whereof I have signed my name to this specification in the presence of two subscribing witnesses.

JOSEPH N. PARKER.

Witnesses:
 WILLIAM D. CONNER,
 HARRY SMITH.